United States Patent [19]

Mathis et al.

[11] 4,405,745

[45] Sep. 20, 1983

[54] POLYMER STABILIZATION

[75] Inventors: Ronald D. Mathis; Jerry O. Reed, both of Bartlesville, Okla.

[73] Assignee: Phillips Petroleum Company, Bartlesville, Okla.

[21] Appl. No.: 422,786

[22] Filed: Sep. 24, 1982

[51] Int. Cl.³ ............................................. C08K 3/28
[52] U.S. Cl. .................................... 524/429; 524/436; 528/388
[58] Field of Search ................. 524/429, 436; 528/388

[56] References Cited

U.S. PATENT DOCUMENTS 4,214,021  7/1980  Blackwell .................... 427/385 R Primary Examiner—Melvyn I. Marquis

[57] ABSTRACT

The heat stability of arylene sulfide polymers, such as poly(p-phenylene sulfide), is improved by the addition of cure retarders comprising alkaline earth metal nitrites.

12 Claims, No Drawings

POLYMER STABILIZATION

FIELD OF INVENTION

This invention relates to improving the characteristics of arylene sulfide polymer compositions. In accordance with another aspect, this invention relates to the use of cure retarders in poly(arylene sulfide) polymer compositions. In accordance with another aspect, this invention relates to the use of cure retarders and heat stabilizers in poly(arylene sulfide) polymer compositions to retard cross-linking or substantial alteration of physical properties during heating. In accordance with a further aspect, this invention relates to the use of selected stabilizers to improve the heat stability of arylene sulfide polymer compositions, especially poly(p-phenylene sulfide) polymers. In accordance with a further aspect, this invention relates to improving the heat stability of fiber and film grade poly(p-phenylene sulfide) polymers by the addition of a cure retarder or stabilizer.

BACKGROUND OF THE INVENTION

In applications, such as in the production of fibers and films from arylene sulfide polymers, it is desirable that the melt flow and molecular weight of the polymer remain substantially unchanged during processing of the polymer. Various procedures have been utilized to stabilize arylene sulfide polymers against changes in physical properties during processing. It has now been discovered that arylene sulfide polymers can be treated in a manner such that the polymer properties remain substantially unchanged during heating of the polymer by incorporating into the polymer a cure retarder.

Accordingly, an object of this invention is to provide a process for improving the heat stability of arylene sulfide polymers.

A further object of this invention is to provide an improved process for stabilizing the physical properties, especially melt flow and molecular weight, of arylene sulfide polymers during processing.

A further object of this invention is to provide arylene sulfide polymers having improved physical properties with respect to melt flow and molecular weight, in particular.

A further object of this invention is to provide phenylene sulfide polymers exhibiting improved heat stability.

Other objects, aspects, and the several advantages of the invention will be apparent to those skilled in the art upon a study of the specification and the appended claims.

SUMMARY OF THE INVENTION

According to the invention, the heat stability of arylene sulfide polymers is improved by the addition of an effective stabilizing amount of at least one alkaline earth metal nitrite which retards curing and cross-linking of the resin during heating.

In accordance with another embodiment of the invention, the heat stability of poly(arylene sulfide) polymers, for example, poly(p-phenylene sulfide) polymers, is improved by incorporating therein prior to heating to processing conditions an effective stabilizing amount of at least one alkaline earth metal nitrite to retard curing and cross-linking during heating and processing of the polymer.

In accordance with still another embodiment of the invention, the heat stability of film or fiber grade poly(p-phenylene sulfide) polymers is improved by the addition of an alkaline earth metal nitrite.

In accordance with a specific embodiment of the invention, minor amounts of an alkaline earth metal nitrite, e.g. calcium nitrite at about 1 weight percent, admixed with poly(p-phenylene sulfide) (PPS) provides a cure retarding effect (stabilizing effect) based on the storage modulus results obtained with a Rheometric Dynamic Spectrometer. For example, PPS alone increases in storage modulus at 300° C. over 14 minutes by 105 percent. At the same conditions, the PPS-calcium nitrite composition increased only 54 percent whereas a PPS-sodium nitrite composition increased 154 percent.

DESCRIPTION OF THE PREFERRED EMBODIMENTS

The invention is applicable for use with any normally solid, heat curable, high molecular weight arylene sulfide polymer that can be formed into fiber and film. Arylene sulfide polymers which can be employed in the process of this invention include arylene sulfide polymers which have a melt flow of at least about 20 and generally within the range of about 50 to about 400 and higher (determined by the method of ASTM D 1238-70, modified to a temperature of 316° C. using a 5-kg weight, the value being expressed as g/10 min.). Thus, the arylene sulfide polymers can be linear, branched or lightly cross-linked. Although the method by which the polymers of this description are produced is not critical, preferably the polymer employed in the process is prepared by use of polyhaloaromatic compounds, alkali metal sulfides, and organic amides. For example, the arylene sulfide polymers for use in this invention can be produced by the method of U.S. Pat. No. 3,354,129 which is hereby incorporated by reference. The preferred type polymer employed for use in fiber and film applications is prepared by use of a p-dihalobenzene, an alkali metal sulfide, an organic amide, and an alkali metal carboxylate as in U.S. Pat. No. 3,919,177. The disclosure of U.S. Pat. No. 3,919,177 is hereby incorporated by reference.

The cure retarders or cure stabilizers of the invention can be any of the alkaline earth metal nitrites, i.e., Group 11A metal nitrites. Representative compounds include magnesium nitrite, calcium nitrite, barium nitrite, and the like and mixtures thereof. Presently preferred is calcium nitrite.

The amount of cure retarder incorporated into the arylene sulfide resin will be a finite, effective amount sufficient to improve the heat stability of the polymer. In general, the cure retardant additives of this invention are employed in an amount within the range of about 0.1 to about 5, preferably about 0.5 to about 2 and most preferably about one (1) weight percent based on the weight of the arylene sulfide polymer.

In addition to the cure retardant additives of this invention, the compositions can contain other ingredients conventionally employed in arylene sulfide polymer compositions formed into fibers and films. For instance, fillers such as zinc oxide, pigments, resins, and/or plasticizers, and the like can be present so long as the particle size is small enough to permit passage of polymer through the processing equipment during formation of fibers and films.

The cure retarder can be incorporated into the arylene sulfide polymer at any stage of processing, preferably prior to being subjected to elevated temperature, or at such times as it is desired to retain melt flow stability. In one practical application of the invention, the cure retarders are incorporated into the arylene sulfide resin, such as a poly(p-phenylene sulfide) polymer, prior to melt spinning to form fibers or other formed articles so that gel formation is reduced during melt spinning and problems with filter and spinneret plugging is reduced or obviated.

The processes of this invention of incorporating the cure retarder into the polymer can be conducted batchwise or continuously.

The following example is intended to illustrate the compositions and process of the invention.

EXAMPLE

Sample Preparation, Test Method and Results

A series of samples was prepared by mixing individual portions of linear poly(p-phenylene sulfide), abbreviated PPS, with the specified metal salt, when employed. The PPS was produced in the manner disclosed in U.S. Pat. No. 3,919,177. The recovered polymer was in the form of a powder (fluff) having a melt flow of 250 g/10 minutes as determined in accordance with ASTM D 1238-70, modified to a temperature of 316° C. and using a 5 kg weight.

The procedure consisted of mixing 15 g of the PPS powder with 0.15 g of the metal salt which was dissolved in about 50 cc of methanol. The solvent was removed from each mixture at ambient conditions in a fume hood, e.g. overnight or longer, if necessary. The dried powders were stirred and additionally dried in a vacuum oven at room temperature (about 23° C.) for approximately 2 hours.

Discs measuring 1×0.25 inches (2.54×0.64 cm) were pressed from about 2.5 g of each sample at room temperature by employing a mold and a laboratory press using a platen pressure of about 10,000 psig (69 MPa). Each disc was subsequently melted and converted into a test button by compression molding at 325° C. The molding cycle typically comprised 2½ minutes at a platen pressure of about 5,000–10,000 psig (34–69 MPa) and about 2½ minutes at a platen pressure of about 30,000 psig (207 MPa). While maintaining the latter pressure, heating was discontinued and cooling initiated by circulating tap water through the platens. When the mold temperature reached about 121° C., the pressure was released and the test button removed from the mold. The finished buttons measured about 1×0.1875 inches (2.54×0.48 cm).

Each button was evaluated for changes in degree of crosslinking or melt viscosity in a test employing a Rheometric Dynamic Spectrometer (RDS), available from Rheometrics, Inc. The test, which determines storage modulus as a function of time at a constant shear of 10 radians per second is useful in evaluating the thermal stability of the sample, e.g. crosslinking propensities can be determined.

The apparatus comprises two 1 inch diameter stainless steel plates, the bottom plate connected to a sensing device while the top plate can be horizontally oscillated. The test button is placed between the plates which have been preheated to 300° C. As the sample starts to melt it is squeezed to a thickness of 2 mm. Excess material is removed and the sample is allowed to thermally equilibrate for 3 minutes. The top plate is then oscillated at 10 radians per second with 10 percent strain. Readings are recorded every minute for 20 minutes as dynes per square centimeter. The percent difference between the 6 minute reading and the 20 minute reading is interpreted as indicating the thermal stability of the sample. A positive difference indicates crosslinking may be occurring, the larger the value the greater the degree of crosslinking, since storage modulus is directly proportional to polymer viscosity. By comparing the results obtained from PPS containing no additive to PPS samples containing a metal salt it becomes possible to assess the effect of the metal salt on the crosslinking process, e.g. it can function as a cure retarder, cure promoter or have essentially no effect.

The test series consisted of 3 samples. Sample 1 was the control containing no metal salt, sample 2 was a comparison in which 1 weight percent sodium nitrite was employed and sample 3 was the invention in which 1 weight percent calcium nitrite was employed. The results are given in the Table.

TABLE

| | | | Influence Of Metal Nitrites On Storage Modulus | | | | |
|---|---|---|---|---|---|---|---|
| Run No. | Metal Nitrite | Sample Melt Flow g/10 min | Storage Modulus (SM), Dynes/cm$^2$ | | | | $\dfrac{SM_{20}-SM_6}{SM_6} \times 100$ |
| | | | 2 min | 6 min | 20 min | $SM_{20}-SM_6$ | |
| 1 | None | 250 | 1020 | 1140 | 2340 | 1200 | 105% |
| 2 | Sodium | 143 | 6000 | 5140 | 13070 | 7930 | 154% |
| 3 | Calcium | 197 | 3360 | 3630 | 5600 | 1970 | 54% |

The results indicate that both calcium nitrite and sodium nitrite initially reduce melt flow for PPS based on the melt flow values relative to the control absent the metal salts. After 6 minutes on test, relative to the 2 minute values, the storage modulus of the control increased about 12%, the storage modulus of the sodium nitrite sample decreased about 14%, suggesting that the sample viscosity is decreasing, and the storage modulus of the calcium nitrite sample increased about 8%. However, in the last 14 minutes of the test in going from 6 minutes to 20 minutes, the results show that the storage modulus of the control increased about 105%, the storage modulus of the sodium nitrite sample increased about 154% and the storage modulus of the calcium nitrite sample only increased about 54%. Thus, relative to the control, the results show that whereas sodium nitrite accelerates curing, e.g. acts as a cure promoter, calcium nitrite retards curing, e.g. acts as a cure retarder. The results obtained with the above samples as well as with a number of others suggest that thermal equilibration in this test is reliably achieved after about 6 minutes into the test. The results in the last 14 minutes of the test are therefore believed to be of the most value and are useful for evaluating the effects of various additives in arylene sulfide polymers.

We claim:

1. A polymer composition exhibiting improved heat stability comprising an arylene sulfide polymer containing an effective stabilizing amount sufficient to retard polymer curing and cross-linking of at least one alkaline earth metal nitrite.

2. An article of manufacture formed from the composition of claim 1.

3. A fiber or film formed from the composition of claim 1.

4. A composition according to claim 1 wherein the amount of stabilizer present ranges from about 0.1 to about 5 weight percent based on the weight of the arylene sulfide polymer.

5. A composition according to claim 4 wherein said arylene sulfide polymer is a poly(p-phenylene sulfide) having a melt flow of about 50 to about 400.

6. A composition according to claim 1 wherein said arylene sulfide polymer is poly(p-phenylene sulfide) and said alkaline earth metal nitrite is calcium nitrite.

7. A composition according to claim 6 wherein the amount of calcium nitrite present is about 0.5 to about 2 weight percent based on the weight of poly(p-phenylene sulfide).

8. A method for improving the heat stability of poly(arylene sulfide) polymers which comprises incorporating therein an effective stabilizing amount of an alkaline earth metal nitrite which amount is sufficient to retard curing and cross-linking of said polymer during heating.

9. A method according to claim 8 wherein the amount of said stabilizer ranges from about 0.1 to about 5 weight percent based on the weight of said polymer.

10. A process according to claim 8 wherein said polymer is poly(p-phenylene sulfide).

11. A method according to claim 8 wherein said arylene sulfide polymer is poly(p-phenylene sulfide) and said alkaline earth metal nitrite is calcium nitrite.

12. A method according to claim 11 wherein said amount of calcium nitrite present is about 0.5 to about 2 percent based on the weight of poly(p-phenylene sulfide).

* * * * *